United States Patent [19]

Morgan et al.

[11] 4,061,712

[45] Dec. 6, 1977

[54] RECOVERY OF VANADIUM VALUES

[75] Inventors: Kenneth A. Morgan, Hoffman Estates, Ill.; Marilyn Miller, Tucson, Ariz.

[73] Assignee: UOP Inc., Des Plaines, Ill.

[21] Appl. No.: 735,703

[22] Filed: Oct. 26, 1976

[51] Int. Cl.$^2$ ............................................. C01G 31/00
[52] U.S. Cl. ...................................... 423/67; 423/68; 423/592; 423/593
[58] Field of Search ..................... 423/67, 68, 593, 62, 423/64

[56] References Cited

U.S. PATENT DOCUMENTS 2,357,466 9/1944 Frick ....................................... 423/67

FOREIGN PATENT DOCUMENTS 1,394,024 5/1975 United Kingdom ................... 423/68
302,129 12/1928 United Kingdom ................... 423/67

*Primary Examiner*—Herbert T. Carter
*Attorney, Agent, or Firm*—James R. Hoatson, Jr.; Raymond H. Nelson; William H. Page, II

[57] ABSTRACT

Vanadium values such as those in the form of vanadium pentoxide may be recovered from vanadium-containing materials by leaching the vanadium-containing material with caustic and thereafter precipitating insoluble salts of vanadium with an ammonium-containing compound followed by separation and recovery. After suitable stripping of the ammonia from the lean leach solution, said solution may be recycled to the leach step. The recovery of the vanadium values is enhanced by effecting the precipitation step in the presence of carbon dioxide which maintains the pH of the solution in the optimum range.

11 Claims, 1 Drawing Figure

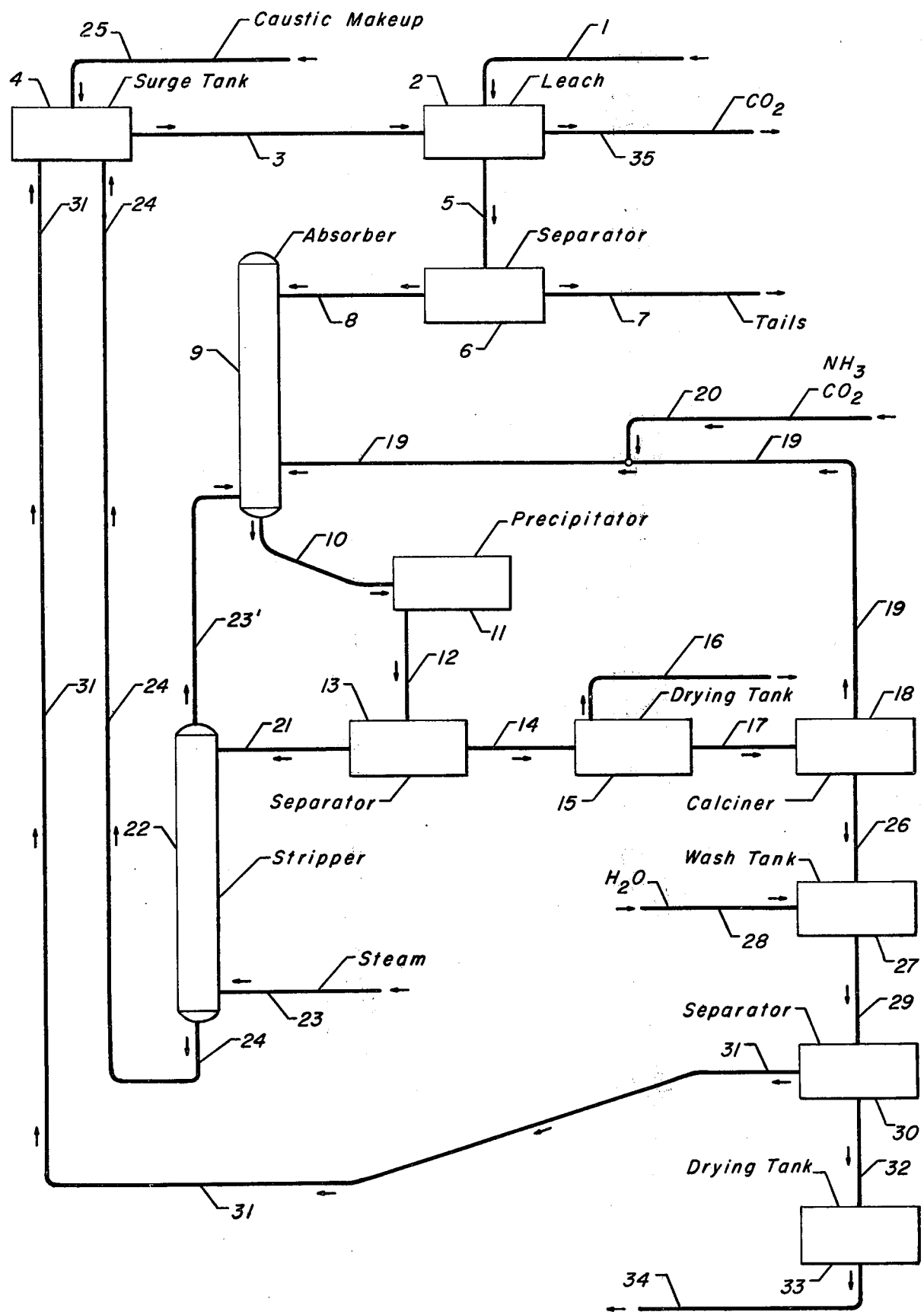

RECOVERY OF VANADIUM VALUES

BACKGROUND OF THE INVENTION

The obtention of vanadium values from vanadium-containing materials is effected in a wide variety of processes. For example, the vanadium-containing material can be subjected to the action of sulfuric acid, sodium oxychloride, hydrochloric acid, nitric acid, etc. In addition, the prior art has also utilized certain ammonium salts such as ammonium chloride, ammonium sulfate, etc., as the precipitating agent whereby insoluble vanadium salts are formed. However, each of the prior art methods possesses certain disadvantages. For example, when utilizing acidic compounds such as hydrochloric acid, nitric acid, sulfuric acid, etc., the problem of clean-up of unwanted chemical compounds necessitates the use of relatively expensive and complicated apparatus in order to avoid the problem of polluting the environment. Furthermore, when utilizing ammonium salts such as ammonium chloride, as exemplified by the method set forth in U.S. Pat. No. 3,320,024 in which ammoniacal ammonium chloride is used to precipitate ammonium metavanadate or ammonium sulfate, etc., the problem of an eventual buildup of chloride or sulfate ions is present. This buildup is unwanted in view of the fact that the mother liquor will, after the caustic leach, eventually contain an amount of salts such as alkali chlorides or alkali sulfates which are of insufficient caustic strength to take the vanadium into solution during the leaching operation.

In contradistinction to this, it has now been discovered that a soluble vanadium value which has been leached with a caustic may be precipitated by utilizing gaseous ammonia in the presence of carbon dioxide which will maintain the pH of the solution in a critical range so that a greater separation of insoluble ammonium vanadates may be obtained than has heretofore been possible.

The invention relates to a process for the recovery of vanadium values from vanadium-containing sources. More specifically, the invention is concerned with an improvement in the process for the recovery of vanadium values whereby greater yields of the desired product may be obtained.

Vanadium values such as vanadium metal or vanadium oxides are useful for many purposes in the chemical industry. For example, vanadium metal may be used as the target material for X-rays, in the manufacture of steel or in the manufacture of vanadium compounds such as catalysts or alloys. Likewise, vanadium oxides such as vanadium pentoxide, are used as the starting material for other vanadium salts, as a catalyst for the oxidation of sulfur dioxide, as a gasoline catalyst, as a catalyst for organic reactions, as a ceramic coloring material, for inhibiting ultraviolet transmission in glass, in black inks, in photographic developers, in dyeing textiles, in medicine, etc.

It is therefore an object of this invention to provide a process for recovering vanadium values from vanadium-containing sources.

A further object of this invention is to provide an improvement in the process for obtaining vanadium values from vanadium-containing sources whereby the process may be effected in a more advantageous economic manner.

In one aspect an embodiment of this invention resides in a process for the recovery of vanadium values from a vanadium bearing source which comprises the steps of: (a) treating a vanadium oxide bearing source with a caustic solution at leaching conditions in a leaching zone, (b) separating the pregnant leach liquor from insoluble tailings, (c) treating said pregnant leach liquor with a soluble ammonium-containing compound and carbon dioxide at precipitation conditions in a precipitation zone, (d) separating the resulting insoluble ammonium vanadates from caustic solution, ammonium compounds and soluble vanadates, (e) stripping said caustic solution to remove ammonia, (f) recycling said stripped caustic solution to said leaching zone, and (g) recovering and treating said solid ammonium vanadates to produce the desired vanadium product.

A specific embodiment of this invention is found in a process for the recovery of vanadium values from a vanadium bearing source which comprises the steps of treating a vanadium oxide source with sodium hydroxide or sodium carbonate in a leaching zone at a temperature in the range of from about ambient to about 250° C. and a pressure in the range of from about atmospheric to about 550 pounds per square inch (psi), separating the pregnant leach liquor from insoluble tailings, treating the pregnant leach liquor with gaseous ammonia and carbon dioxide at temperatures in the range from about 0° to about 80° C. at a pH in the range of from about 6.0 to about 9.0, separating the solid ammonium vanadates from the solution of sodium carbonate, ammonium carbonate and soluble vanadates, stripping the caustic solution with steam to remove ammonia and some carbon dioxide, and recycling the stripped caustic solution to the leaching zone.

Other objects and embodiments will be found in the following further detailed description of the present invention.

As hereinbefore set forth the present invention is concerned with an improvement in a process for recovering vanadium values from a vanadium-containing material. Heretofore, vanadium-containing materials have been leached with caustic solution to solubilize the vanadium, the concentration of the vanadium being dependent upon the concentration of the caustic which is essentially employed. Following this the precipitation of the vanadium was accomplished by acidification with an acid such as sulfuric acid, nitric acid, etc. However, this procedure consumes the caustic and the acid in the neutralization step and therefore additional caustic and acid were required for subsequent leaching operations. In contradistinction to this procedure, we now precipitate an insoluble salt of vanadium from the pregnant caustic leach liquor with a volatile ammonium compound or solution such as gaseous ammonia, ammonium hydroxide, etc. By utilizing this type of ammonium-containing compound or solution as an addition to the pregnant leach liquor, it will not only precipitate the vanadium as ammonium meta-vanadate, or some other insoluble ammonium salt of vanadium, but it will also permit regeneration of the leach liquor as well as by, for example, steam stripping. Therefore, it is possible to recycle the resultant stripped leach liquor to the leaching step and utilize the same in subsequent leaching steps. After precipitation of the ammonium vanadates, the solids may then be separated and recovered in a manner hereinafter set forth in greater detail.

It has also been discovered that by adding carbon dioxide to the precipitation step it is possible to control the pH of the solution, usually in a range of from about 6.0 to about 9.0. This control of the pH is necessary inasmuch as a pH of greater than about 9 will preclude the precipitation of the solid vanadium salt. By utilizing carbon dioxide and controlling the pH, it is possible to effect a more complete and thorough precipitation of the vanadium, thus insuring a greater yield of the desired vanadium value which is recovered at the end of the process.

Referring now to the drawing, which illustrates one embodiment of the process of the present invention, a calcined feed comprising a vanadium-containing material is charged through line 1 to a leaching zone 2. In leaching zone 2 the vanadium-containing material is contacted with a caustic solution which is charged to leaching zone 2 through line 3 from surge tank 4. The leaching of the vanadium-containing material which will solubilize the vanadium while maintaining the caustic insoluble metals such as nickel, iron, manganese, copper, cobalt, etc., is effected at a temperature in the range of from about ambient to about 250° C. and a pressure ranging from about atmospheric to about 550 psi. The caustic leach is accomplished by utilizing alkali metal or alkaline earth metal solutions such as sodium hydroxide, sodium carbonate, potassium hydroxide, potassium carbonate, lithium hydroxide, magnesium hydroxide, calcium hydroxide, barium hydroxide, etc. After leaching the vanadium-containing material for a period of time which may range from about 0.5 up to about 10 hours or more in duration, the solution is passed through line 5 to a separation zone 6 wherein the tail materials comprising insoluble metals of the type hereinbefore set forth are separated from the pregnant leach liquor. The tails are removed through line 7 while the pregnant leach liquor is passed through line 9 into absorber 9. In absorber 9 the pregnant leach liquor is contacted with a mixture of carbon dioxide and the ammonium-containing compound such as gaseous ammonia, ammonium hydroxide, etc., the pH of the pregnant leach liquor in absorber 9 being maintained in a range of from about 6.0 to about 9.0 in order to insure complete precipitation of the vanadium salts. The level of ammonia in absorber 9 is maintained at a level of from about 1.5:1 to about 5:1 parts of ammonia per part of vanadium. In addition, the temperature at which the ammonia and carbon dioxide is adsorbed in the pregnant leach liquor may range from about 0° to about 80° C. and preferably from about 25° to about 35° C. at atomspheric pressure. However, it is also contemplated within the scope of this invention that higher pressures may be employed, said pressures ranging from 2 to about 1000 psi. If higher pressures are employed, the temperature of the absorption may be increased to about 150° C. without detrimentally effecting the efficiency of the absorption step of the process. The absorption of the ammonia and carbon dioxide into the pregnant leach liquor may be effected during a period of from about 0.5 to about 10 hours or more if ambient temperatures and pressure are employed. In the event that higher temperatures and pressures are used. The residence time in the absorber will be shortened to a considerable extent. Following the desired residence time in absorber 9, the solution is passed through line 10 to precipitator 11 for further admixture and thereafter is withdrawn from precipitator 11 through line 12 to separator 13. In separator 13 the solid vanadium salts are separated from the mother liquor by conventional means such as filtration and passed through line 14 to drying tank 15. It is also contemplated within the scope of this invention that a wash tank, not shown in the drawings, in which the crude ammonium metavanadate is washed with ammonium carbonate, ammonium bicarbonate, other ammonium salt solutions or water, etc., may be inserted in the flow scheme between separator 13 and drying tank 15. In drying tank 15 water is removed through line 16 while the dried product is passed through line 17 to calciner 18. In calciner 18 the solid product comprising the vanadium salts is calcined at a temperature ranging from about 200° to about 650° C. The gaseous ammonia and carbon dioxide are withdrawn from calciner 18 through line 19 and admixed with fresh ammonia and carbon dioxide feed from line 20 and recycled to absorber 9 for use as the precipitating and buffering agent in the recovery of the vanadium value. The liquor which has been separated from the solid vanadates in separator 13 is passed through line 21 to stripper 22 wherein the vanadium-lean filtrate is steam stripped to remove ammonia from the filtrate, said steam being supplied through line 23. The stripped material, which may also contain some carbon dioxide as well as ammonia, is recycled to absorber 9 in which the pregnant liquor is acting as an absorbing medium through line 23'. The bottoms from stripper 22 which may contain the caustic as well as some alkali metal or alkaline earth metal vanadium salt are withdrawn through line 24 and recycled to surge tank 4. In surge tank 4 the recycled caustic is admixed with additional caustic make-up which is charged to surge tank 4 through line 25 and utilized as the leaching material for further treatment of vanadium-containing material.

The solid vanadium pentoxide is withdrawn from calciner 18 through line 26 and washed with water in wash tank 27, the water being admitted through line 28. After washing with water, the solution is passed through line 29 to separator 30 wherein additional alkali metal vanadates may be recovered along with small amounts of ammonia and carbon dioxide which may still have been present along with the solid vanadium pentoxide, the sodium vanadate, ammonia and carbon dioxide being withdrawn through line 31 and recycled to surge tank 4. The solid vanadium values in the form of vanadium oxides such as vanadium trioxide, tetroxide, pentoxide, etc., are withdrawn from separator 30 through line 32 and passed to a drying tank 33 wherein after being subjected to drying at a temperature in the range of from about 90° to about 650° C. are withdrawn to line 34 for storage.

It is to be understood that in leach zone 2 the carbon dioxide is withdrawn through line 35 and may, if so desired, be recycled to line 20 to form a portion of the feed carbon dioxide along with the ammonia which passes through line 19 into absorber 9.

While the drawing shows one embodiment in which the solid vanadium values are withdrawn from separator 13 and subjected to various steps of separation and purification such as drying, calcination, washing, etc., it is also contemplated that any other methods for the recovery of the desired vanadium values may be employed without departing from the scope of this invention.

The following examples are given for purposes of illustrating the process of this invention. However, it is to be understood that these examples are not intended to limit the generally broad scope of the present invention in strict accordance therewith.

EXAMPLE I

A calcined feed consisting of a mixture of metal values including nickel, iron and a major portion of about 70% vanadium may be charged to a leaching zone at a rate of about 1000 kg/hr, said leaching zone being maintained at a temperature in the range of from about 90° to about 105° C. at atmospheric pressure. In said leaching zone, the ore may be contacted with a sodium hydroxide or sodium carbonate solution which may be charged to the leaching zone at a rate of about 4033 kg/hr. After leaching at this temperature for a period of from 1 to 6 hours, the solution containing soluble vanadium salts and insoluble tailings may be withdrawn from the zone at a rate of about 5033 kg/hr and charged to a liquid-solid separator. The liquids and solids may be separated, 279 kg/hr of tailings comprising insoluble metal salts may be withdrawn while 4754 kg/hr of soluble vanadium salts may be charged to an absorber. The soluble vanadium salt solution may be contacted in said absorber with a mixture of gaseous ammonia and carbon dioxide. After admixture in the absorber, the resulting solution may be passed to a precipitator which may be maintained at a temperature of about 35° C. and atmospheric pressure. The soluble vanadium salts may be converted to solid ammonium vanadates in the precipitator and the resulting mixture may be withdrawn from the precipitator at a rate of about 5170 kg/hr and passed to a separator. The solid ammonium vanadates may be separated from the liquor and the latter may be charged at a rate of 3470 kg/hr to a stripper. In this stripper the liquors may be steam stripped by contact with steam which may be charged to the stripper at a rate of about 10 kg/hr. The resulting ammonia, carbon dioxide and water in an amount of 190 kg/hr, 25 kg./hr and 10 kg/hr respectively may be recycled to the absorber while the stripped liquid may be withdrawn from the stripper as bottoms at a rate of 3255 kg/hr and recycled to a surge tank. In the surge tank the liquor may be admixed with a fresh supply of sodium hydroxide and utilized as the leaching medium for the leaching step of the process. The solid amonium vanadates in an amount of 1700 kg/hr may be withdrawn from the separator and passed to a drying step wherein water at a rate of about 621 kg/hr may be removed. The dried ammonium vanadates may be withdrawn from the drying oven which may be maintained at a temperature of about 110° C. at a rate of 1079 kg/hr and passed to a calcination zone. This calcination zone may be maintained at a temperature of about 250° to about 650° C. whereby the ammonium vanadates may be converted to vanadium oxide and ammonia. The resulting mixture may be withdrawn at a rate of about 888 kg/hr and passed to a wash tank wherein the mixture may be contacted with water which may be added at a rate of 982 kg/hr. The resulting solution at a rate of 1870 kg/hr may be withdrawn from the wash tank and passed to a separation zone. In this separation zone, the liquid at a rate of 765 kg/hr and which contains sodium values along with small amounts of ammonia and carbon dioxide may be recycled to the surge tank. The solid vanadium oxides in an amount of 1105 kg/hr may be passed to a drying zone which may be maintained at a temperature of about 110° C. In this final drying zone, the remaining water may be removed and the desired vanadium oxide may be recovered and passed to storage.

EXAMPLE II

In this example the process of the present invention was illustrated on a smaller scale by preparing a solution of vanadium pentoxide in 1.5 molar sodium carbonate. The thus prepared solution was fed in a downflow at a rate of 1.8 cc/min. through a column packed with 200 cc of glass beads. At the same time carbon dioxide and ammonia gas were introduced at the bottom of the column. Some precipitate was formed in the column but the majority of the vanadium stayed in solution due to the slow rate of precipitation of sodium metavanadate and ammonium metavanadate under the conditions at which the treatment was effected. At the end of 70 minutes, during which time the column was maintained at a temperature of 50°-55° C., the solution was recovered. The original solution prior to treatment with the ammonia gas and carbon dioxide contained 2.9 molar vanadium while analysis of the solution after the 70-minute run disclosed that it contained only 0.25 molar vanadium along with 10.8 molar ammonia and 6.6 molar carbon dioxide. The precipitate which formed during the 70-minute period was collected, washed with ammonium bicarbonate solution and calcined at a temperature of 260° C. to form vanadium pentoxide and sodium vanadates. The product which was recovered after calcination contained 2.4% sodium. The liquors which were separated from the precipitate were cooled to room temperature at which time more solid precipitate appeared. At room temperature the solution was again analyzed and found to contain only 0.05 molar vanadium. The precipitate was collected, washed with ammonium bicarbonate solution and subjected to calcination at a temperature of 260° C.

The liquid may then be stripped of ammonia and carbon dioxide at a temperature in the range of from about 95° to about 110° C. and the stripped mother liquors which contain sodium carbonate and a low concentration of vanadium may then be recycled to the leaching section while the ammonia which may be obtained upon calcination of the ammonium metavanadate may be recycled to the precipitation column.

EXAMPLE III

In this experiment soluble vanadium salts were obtained by leaching vanadium pentoxide in a 1.5 molar sodium carbonate solution. The resulting solution was fed downflow at a rate of 15 cc/min. through a column which was packed with 200 cc of glass beads. Simultaneously with the downflow of the soluble vanadium salts, carbon dioxide and ammonia were introduced at the bottom of the column. Due to the rapid downflow of the vanadium salts through the column, no precipitate was formed during the 10 minutes that the vanadium solution was pumped through the column. The original solution contained 3.4 molar vanadium salts and analysis of the treated solution after precipitation of solid vanadium salts had occurred disclosed that it contained only 1.8 molar vanadium along with 4.9 molar ammmonia and 1.9 molar carbon dioxide. Therefore, it is shown that even during a relatively high vanadium flow rate and over a relatively short period of time a considerable amount of vanadium is collected as solid vanadium salts in the collection vessel. The precipitate was separated from the mother liquor, washed with ammonium bicarbonate solution and calcined at a temperature of 260° C. to form vanadium pentoxide and sodium vanadates. The liquors which remained after separation from the precipitate were allowed to stand for a period of about 2 hours until the liquor contained only 0.33 molar vanadium. The mother liquors were then stripped with steam at a temperature of 100° C. and recycled to the leaching section.

EXAMPLE IV

In this example 228.9 grams of a solid calcine which was obtained from an organic, petroleum-derived, metals containing oil was leached with 555 cc of 1.8 M sodium carbonate solution for 3 hours at reflux. The unleached solid calcine contained 114 grams of vanadium, 7.8 grams of iron and 12.4 grams of nickel. Upon completion of the leaching operation, the solution was filtered, followed by washing and drying the tails. This produced 78.1 grams of tails which contained 27 grams of vanadium, along with approximately the same amounts of iron and nickel. Thereafter the combined leach and wash liquors were reduced in volume to 526.5 cc by boiling the solution. This solution contained 85 grams of vanadium which was 74.1% of the vanadium present in the original calcine and possessed a pH of 8.6 The washed and dried tails were then subjected to a second leach with an excess of 1.8 M sodium carbonate solution and an additional 8% of the original vanadium was removed by the leach, the total vanadium being removed comprising 82.1%.

A portion of the solution resulting from the concentration of the leach and wash liquors from the first step leach was treated with ammonia and carbon dioxide to precipitate ammonium metavanadate. This step was effected by pumping 208 cc of the solution downflow through a column packed with glass spheres, the liquid being pumped at a rate of 13 cc per minute. After passage through the column, the liquid was collected in a stirred 1000 cc flask which was attached the column. The ammonia and carbon dioxide were introduced into the solution at a point below the surface of the liquid, the excess gases passing upwardly through the glass spheres. The ammonia and carbon dioxide were charged through the stirred solution for a period of 1 hour after all of the liquid has been pumped through the column. Upon completion of the addition of the gas, the solution was stirred for an additional 18 hours. At the end of this time, the solution was filtered and the solid was washed with 40 cc of 6 M ammonium bicarbonate solution. Air drying produced 64.5 grams of a white solid which was calcined for 3 hours at 260° C. Analysis of the dark solid disclosed the presence of less than 0.1% sodium, thus permitting the recycle of the liquid portion of the solution which contained a major portion of the caustic in the form of sodium carbonate to the leach step. As usual, prior to reuse, the caustic solution is stripped of excess ammonia.

EXAMPLE V

To illustrate the ability to recycle the leach liquor back to the leaching step, the following experiment was performed in which 246 cc of liquors which remained after precipitation of the ammonium metavanadate were diluted to 500 cc with water. It was determined that the vanadium concentration of the undiluted leach liquor was less than 0.5 M. The diluted solution was brought to a boil and a low stream of nitrogen was passed through the solution. Following this, approximately 50% of the solution was evaporated, the solution was cooled and made up to exactly 250 cc with water. It was found that the solution contained 0.33 M vanadium and 1.14 M carbon dioxide. An analysis for ammonia disclosed that there was less than 0.01% ammonia present. The above solution which was stripped of virtually all of the ammonia was thereafter employed to leach vanadium from a high vanadium-containing calcine which was obtained from a metals-containing organic material. The leach was effected by refluxing 11 cc of the stripped leach liquor with 2.4 grams of the calcine for a period of 2.6 hours. At the end of this period, the solution was cooled and filtered. The tails were washed with water and dried to yield 0.88 grams of a material which contained 31.6% vanadium (the preleached calcine contained 45.0% vanadium). Therefore it was determined that the tails contained 0.28 grams of vanadium which indicated that 75% of the vanadium present was leached from the calcine by use of the recycled leach liquor.

We claim as our invention:

1. A process for the recovery of vanadium values from a vanadium bearing source consisting of the steps of:
   a. leaching the vanadium bearing source with caustic solution;
   b. separating the pregnant leach liquor from insoluble tailings;
   c. treating said pregnant leach liquor with ammonia and carbon dioxide at a pH in the range of from about 6.0 to about 9.0 thereby precipitating insoluble ammonium vanadates therefrom;
   d. separating the precipitated insoluble ammonium vanadates grom caustic solution, ammonium compounds and soluble vanadates;
   e. stripping said caustic solution with steam to remove ammonia;
   f. supplying the resultant vaporous mixture of steam and ammonia to step (c) for contact therein with said pregnant leach liquor;
   g. recycling stripped caustic solution from stripping step (e) to leaching step (a); and
   h. calcining said precipitated insoluble ammonium vanadates to produce vanadium oxide therefrom.

2. The process as set forth in claim 1 in which said precipitation is effected at a temperature in the range of from about 0° to about 80° C.

3. The process as set forth in claim 1 in which said ammonia is in gaseous form.

4. The process as set forth in claim 1 in which said ammonia is in ammonium hydroxide form.

5. The process as set forth in claim 1 in which said ammonia is present in precipitation step (c) in a ratio in the range of from about 1.5:1 to about 5:1 parts of ammonia per part of vanadium.

6. The process as set forth in claim 1 in which said leaching step (a) is effected at a temperature in the range of from about ambient to about 250° C. and a pressure in the range of from about atmospheric to about 550 pounds per square inch.

7. The process as set forth in claim 1 in which said caustic solution is sodium hydroxide.

8. The process as set forth in claim 1 in which said caustic solution is sodium carbonate.

9. The process as set forth in claim 1 in which said caustic solution is sodium bicarbonate.

10. The process as set forth in claim 1 in which said caustic solution is potassium hydroxide.

11. The process as set forth in claim 1 in which said caustic solution is lithium hydroxide.

* * * * *